Patented Apr. 22, 1947

2,419,499

UNITED STATES PATENT OFFICE 2,419,499

SOLVENT EXTRACTION OF UNSATURATED MATERIALS

Johan C. D. Oosterhout and Thomas C. Roddy, Jr., Port Arthur, Tex., assignors to The Texas Company, New York, N. Y., a corporation of Delaware No Drawing. Application March 1, 1945, Serial No. 580,482

3 Claims. (Cl. 260—677)

This invention relates to the solvent extraction of unsaturated materials and particularly the extraction or extractive distillation of hydrocarbons containing mono-olefins or di-olefins, or both, with furfural or a furan type of compound.

The invention has to do with employing the solvent, namely furfural, in the presence of an agent adapted to inhibit polymer formation during the extractive treatment and during recovery of the solvent from the hydrocarbons.

More specifically, the invention contemplates employing furfural as an extraction solvent in the presence of a small amount of a compound having at least one phenylamino group and selected from the group of compounds consisting of N-phenyl substituted guanidines, naphthylamines and thioureas. Compounds which have been found effective are $\alpha$, N-phenyl naphthylamine, N,N'-diphenyl guanidine and N,N'-diphenyl thiourea. The term "N-phenyl" is intended to mean that phenyl is substituted on nitrogen.

These compounds are effective in stabilizing furfural at elevated temperatures and are effective in inhibiting polymer formation.

Furfural is a useful solvent for effecting fractional separation between olefinic and paraffin hydrocarbons and also for effecting separation between olefins differing in degree of unsaturation. Thus, it may be used for effecting separation between mono-olefins and di-olefins.

It has been found that when furfural is used to extract unsaturates such as butadiene from hydrocarbon mixtures the furfural becomes contaminated during continued use with a small but appreciable amount of polymer or resin material. The mechanism of this polymer formation is not entirely clear. It may be that furfural under the conditions employed during the extractive treatment or during its recovery from the hydrocarbons undergoes polymerization to a small extent, or may enter into reaction with olefinic hydrocarbons forming polymer material, or both of these reactions may take place. Also, the unsaturated hydrocarbons may undergo polymerization in the presence of the furfural.

The presence of this polymer material in the mixture of hydrocarbons and furfural is objectionable because it forms deposits within the plant apparatus and particularly the distillation, heat exchange and other apparatus used for recovering the furfural. It tends to stick to the metal surfaces and as a result during continued exposure to elevated temperatures is converted into solid carbonaceous form. The deposition of this material upon the surfaces of the heat exchangers interferes with their efficient operation and in addition results in the necessity for frequent cleaning of the apparatus. This deposition may be so serious as to cause a shutdown of the plant.

The present invention, therefore, involves effecting the extraction of olefinic or other unsaturated hydrocarbons from mixtures containing them with furfural in the presence of an inhibitor selected from the foregoing group of compounds. The inhibitor is maintained present in the solvent in amounts of about 0.1 to 0.2% or in amounts ranging from about 0.01 to 0.1% by weight of the furfural. The inhibitor may be added initially to the solvent or may be added periodically or continuously in amounts necessary to maintain the desired concentration in the solvent.

In accordance with the invention wherein it is desired to extract butadiene from a $C_4$ hydrocarbon mixture by extraction or extractive distillation, the hydrocarbon mixture is subjected to contact with furfural in the presence of the inhibitor at temperatures in the range about 140 to 340° F. so as to produce an extract phase comprising furfural and dissolved butadiene. This extract phase is separately subjected to distillation, advantageously in the absence of steam, so as to strip the hydrocarbons from the solvent at temperatures in the range about 280 to 340° F.

Conventional apparatus and procedure may be employed in carrying out the solvent extraction or extractive distillation of hydrocarbons or other liquid mixtures and therefore a detailed description is unnecessary.

The foregoing inhibitors exert a stabilizing effect upon the solvent in the absence of the unsaturated hydrocarbons so that they are useful in stabilizing the solvent where it is being retained in storage or supply tanks for appreciable periods of time at temperatures substantially above atmospheric. For example, a sample of furfural which was substantially water-white in color and contained no inhibitor was subjected to a temperature of about 300° F. in the substantial absence of an oxidizing atmosphere. Within about five seconds color formation was observed. In about 1.3 hours at a temperature of about 320° F. it turned brown, in about 2.3 hours—dark brown, in 3.3 hours—very dark brown, and in 8.3 hours—black (completely opaque).

On the other hand, furfural of the same quality, containing either N,N'-diphenyl thiourea or N,N'-diphenyl guanidine in the proportion of 20 pounds of inhibitor per 1,000 barrels of furfural, after 15 to 20 minutes exposure at about 300° F. remains unchanged. This is to be contrasted with furfural containing certain other types of compounds, such as 2,6-dibutyl-4-methyl phenol, alpha hydroxy-isobutyric acid, which darkens perceptibly in 15 to 20 minutes time. The sample containing the phenol compound darkened considerably even at a temperature not in excess of about 120° F.

By way of additional examples, α,N-phenyl naphthylamine, N,N'-diphenyl guanidine and N,N'-diphenyl thiourea were added to separate quantities of freshly distilled furfural which was substantially water-white in color. The inhibitors were added in the proportion of about 400 pounds of inhibitor per 1,000 barrels of furfural which is equal to 0.1% by weight of the furfural. The furfural containing these inhibitors was maintained at a temperature of about 315 to 320° F. in an oil bath in the substantial absence of an oxidizing atmosphere. The following tabulation indicates the comparative activity of the three compounds in inhibiting color formation over a prolonged period of time.

Development of color in inhibited furfural

| Hours From Start | α,N-phenyl Naphthylamine | N,N'-diphenyl Guanidine | N,N'-diphenyl Thiourea |
|---|---|---|---|
| 0 | Water-White | Water-White | Water-White. |
| 2 | Very Light Brown. | Slight | Slight. |
| 4 | Light Brown | Very Light Brown. | Very Light Brown. |
| 6 | do | Light Brown | Light Brown. |
| 8 | do | do | Do. |
| 10 | Brown | do | Do. |

While the foregoing examples show the utility of the compounds in question for stabilizing furfural at elevated temperatures, nevertheless it is contemplated that these compounds may be used for stabilizing other solvents of the furan type, such as furfuryl alcohol and tetrahydrofurfuryl alcohol. Accordingly, in the appended claims furfural is used in a comprehensive sense to include solvents of the furan type.

Also, while mention has been made of using the invention in conjunction with the solvent extraction of mixtures containing olefinic hydrocarbons it is contemplated that the invention may also be used in conjunction with the solvent treatment of other mixtures containing unsaturated or other substances which promote or enter into polymer formation with the furfural type of solvent.

Obviously many modifications and variations of the invention as above set forth may be made without departing from the spirit and scope thereof, and therefore only such limitations should be imposed as are indicated in the appended claims.

We claim:

1. The method of extracting olefins from an olefinic hydrocarbon mixture which comprises extracting said hydrocarbon mixture containing mono-olefins and di-olefins with furfural at elevated temperatures in the presence of a small amount of a compound having at least one phenylamino group and selected from the group of compounds consisting of N-phenyl substituted thioureas, guanidines and naphthylamines sufficient to inhibit substantial polymer formation, forming a solvent phase containing dissolved olefins and a hydrocarbon phase comprising relatively insoluble hydrocarbons, separating said phases, and removing solvent from the hydrocarbons.

2. The method of extracting olefins from an olefinic hydrocarbon mixture which comprises extracting said hydrocarbon mixture containing mono-olefins and di-olefins with furfural at a temperature in the range about 140 to 340° F. in the presence of a small amount of a compound having at least one phenylamino group and selected from the group of compounds consisting of N-phenyl substituted thioureas, guanidines and naphthylamine sufficient to inhibit substantial polymer formation, forming a solvent phase containing dissolved olefins and a hydrocarbon phase comprising relatively insoluble hydrocarbons, separating said phases, and removing solvent from the hydrocarbons.

3. The method of extracting butadiene from a $C_4$ hydrocarbon mixture containing butadiene and including mono-olefins which comprises extracting said mixture with furfural at a temperature in the range of about 140-340° F. in the presence of a small amount of N,N'-diphenyl thiourea, said thiourea compound amounting to about 0.1 to 0.2 per cent by weight of the furfural, forming a solvent phase comprising butadiene dissolved in furfural and a hydrocarbon phase comprising relatively insoluble hydrocarbons, separating said phases and removing furfural from the hydrocarbons.

JOHAN C. D. OOSTERHOUT.
THOMAS C. RODDY, Jr.

REFERENCES CITED

The following references are of record in the file of this patent:

UNITED STATES PATENTS

| Number | Name | Date |
|---|---|---|
| 2,080,142 | Lowry et al. | May 11, 1937 |
| 2,087,455 | Stratford | July 20, 1937 |
| 2,349,473 | Tannich | May 23, 1944 |
| 2,350,609 | Hachmuth | June 6, 1944 |
| 2,247,926 | Smith | July 1, 1941 |
| 2,294,972 | Figg et al. | Sept. 8, 1942 |
| 2,341,874 | Lovell | Feb. 15, 1944 |